Figure 1:
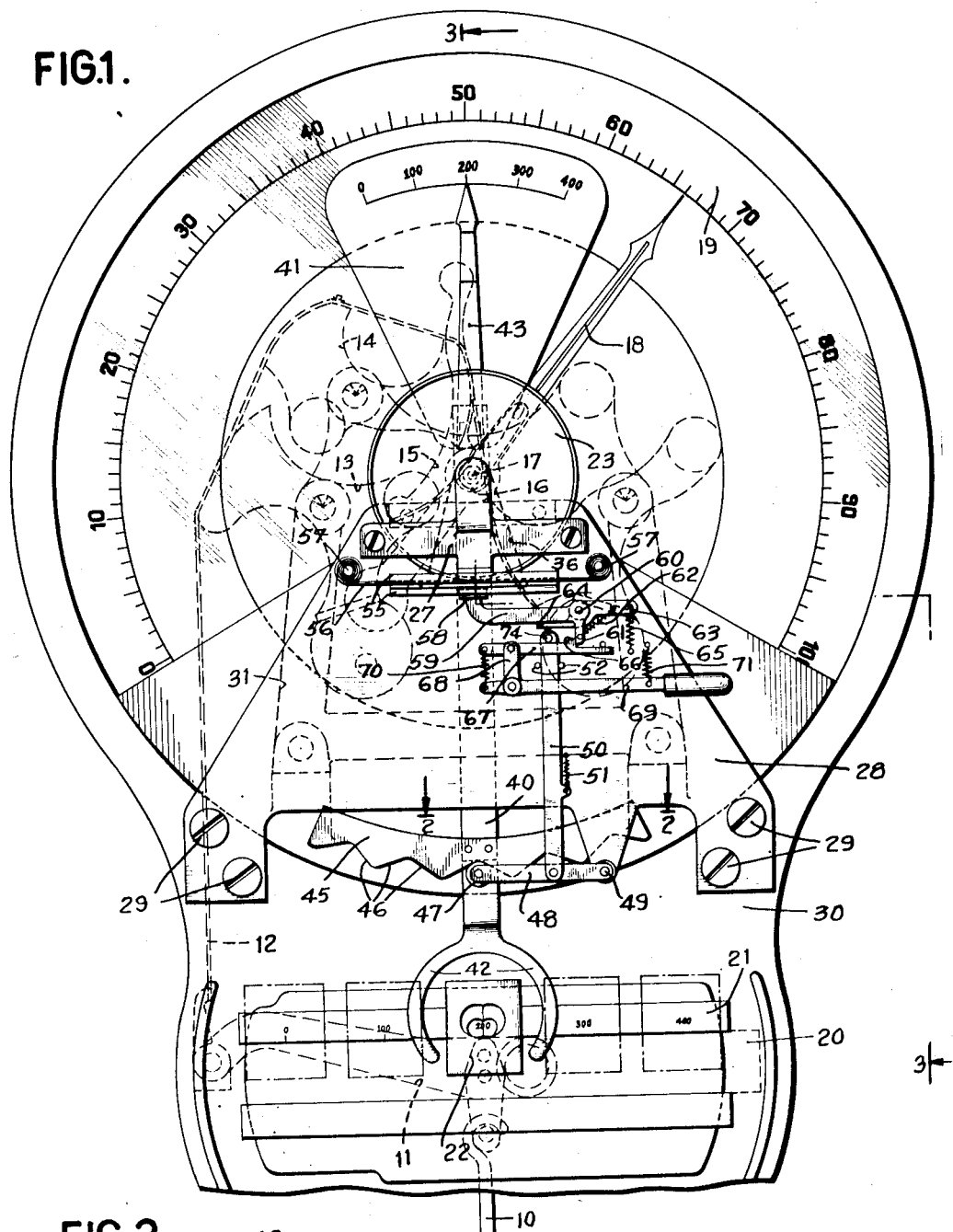

Oct. 8, 1935.   E. J. VON PEIN   2,016,698
PRINTING SCALE
Filed Sept. 15, 1933   4 Sheets-Sheet 1

INVENTOR-
Edward J. Von Pein
BY
ATTORNEY-

Oct. 8, 1935.   E. J. VON PEIN   2,016,698
PRINTING SCALE
Filed Sept. 15, 1933   4 Sheets-Sheet 2
FIG.3.
FIG.4.
FIG.5.
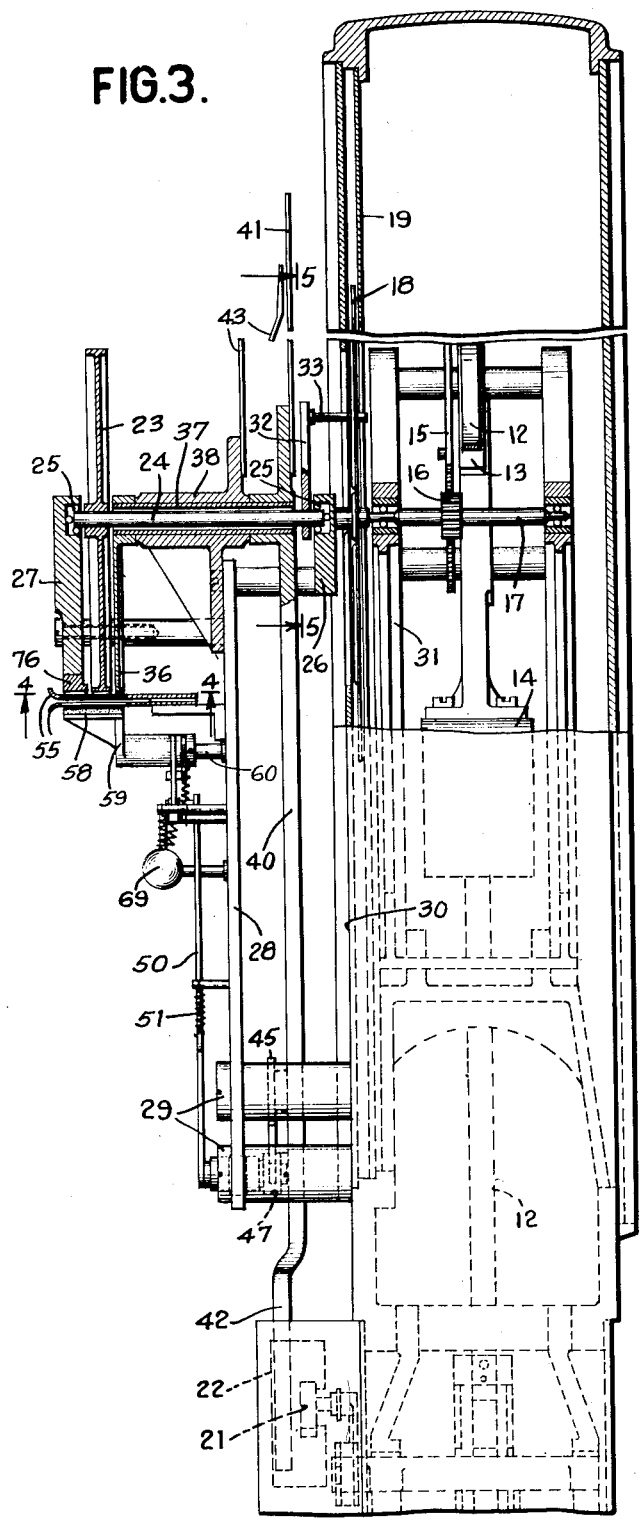
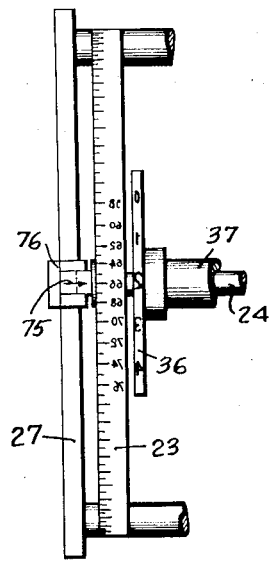
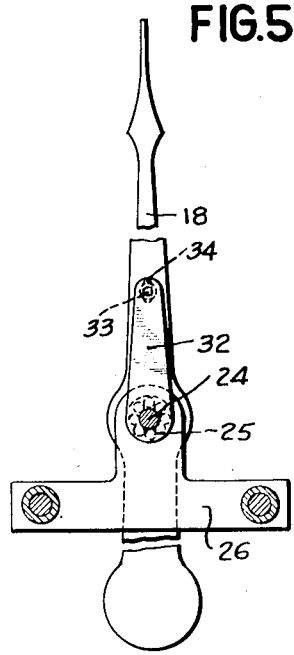
INVENTOR-
Edward J. Von Pein
BY
A. O. Maby
ATTORNEY- Oct. 8, 1935.  E. J. VON PEIN  2,016,698

PRINTING SCALE

Filed Sept. 15, 1933  4 Sheets-Sheet 3

Oct. 8, 1935.  E. J. VON PEIN  2,016,698

PRINTING SCALE

Filed Sept. 15, 1933  4 Sheets-Sheet 4

INVENTOR-
Edward J. Von Pein
BY
A. C. Maby
ATTORNEY-

Patented Oct. 8, 1935

2,016,698

UNITED STATES PATENT OFFICE 2,016,698

PRINTING SCALE

Edward J. Von Pein, Dayton, Ohio, assignor to International Business Machines Corporation, New York, N. Y., a corporation of New York Application September 15, 1933, Serial No. 689,499

13 Claims. (Cl. 265—6)

This case relates to weighing and recording scales.

The object of the invention is to provide a novel printing scale.

Further, the object is to provide a scale in which printing elements will be mechanically operated by the weighing mechanism and in which an imprint may be taken from the printing elements without injury or shock to the weighing mechanism.

Still further, the object is to provide a printing wheel operated in a novel manner by shifting of the capacity poise on the capacity beam.

Another object is to provide an impression effecting means which will positively aline and lock the printing elements in correct position prior to taking the weight impression.

Still further, an object is to provide a convenient pointer and dial indication of the position of the capacity weight and of the printing wheel set thereby.

Further and other objects and advantages will be hereinafter set forth in the accompanying specification and claims, and shown in the drawings, which by way of illustration show what is now considered to be the preferred embodiment of the invention.

Figure 2:
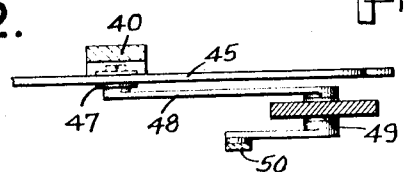
Figure 6:
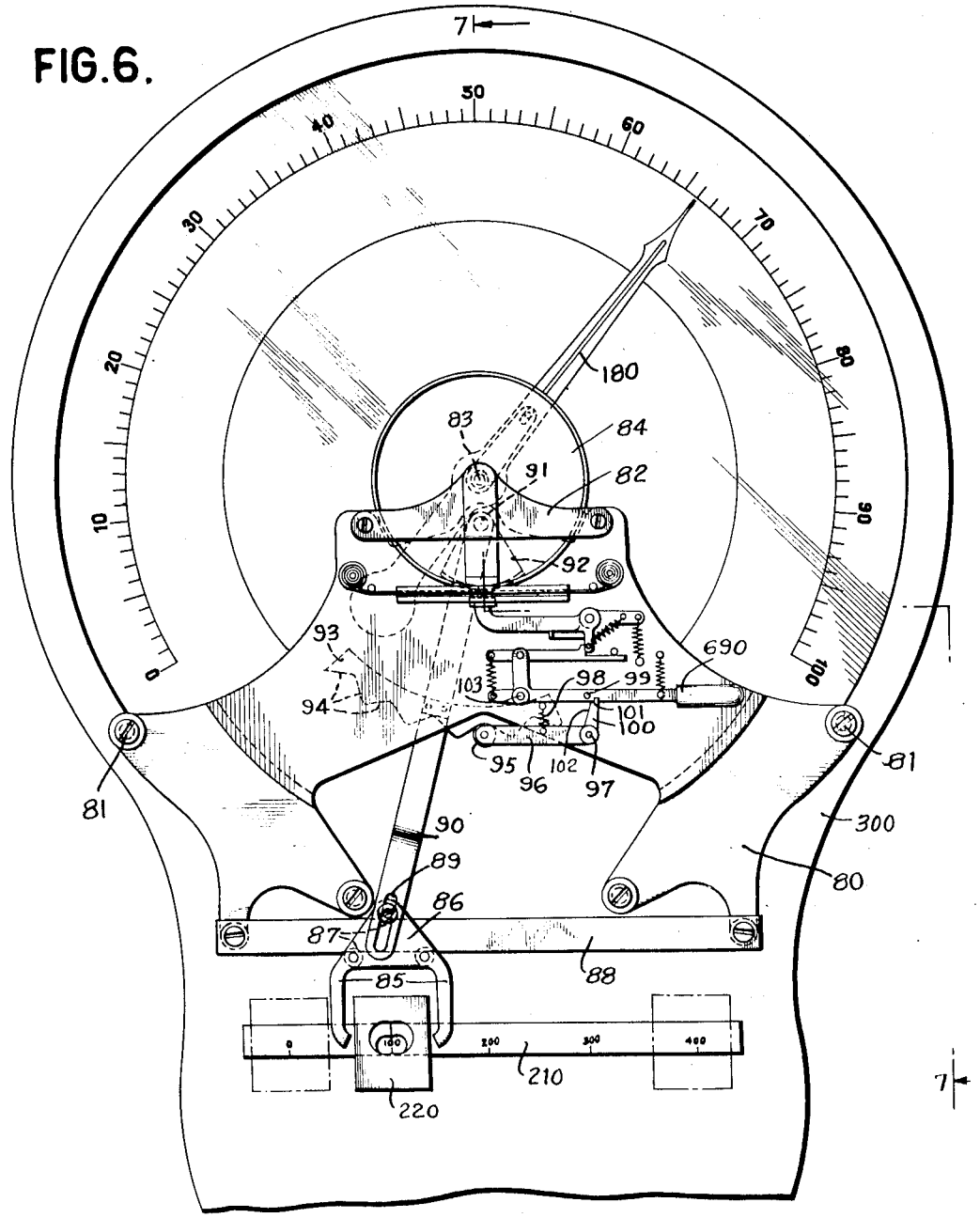
Figure 7:
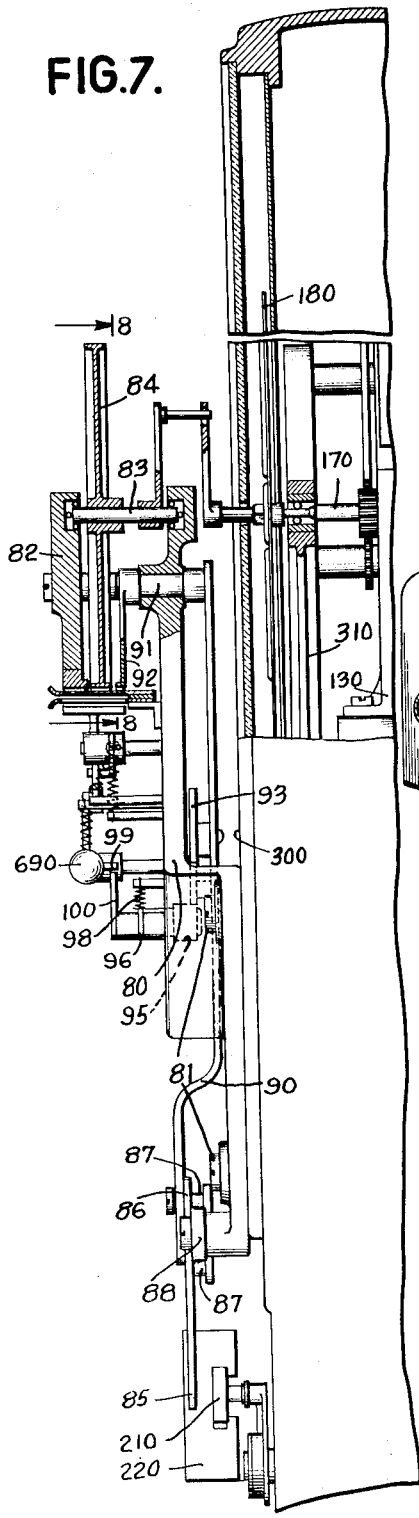
Figure 8:
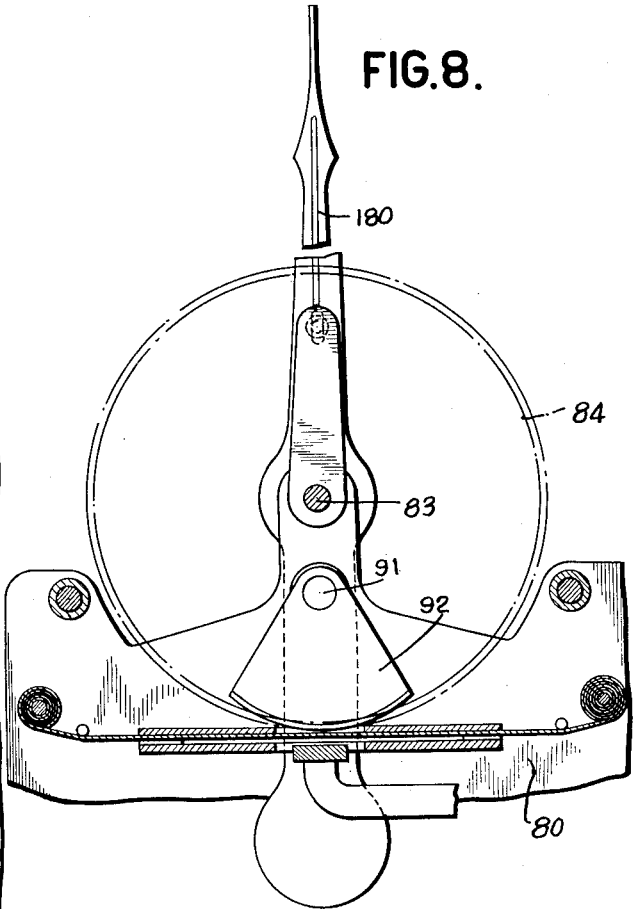
Figure 9:
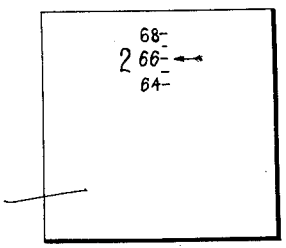

In the drawings:

Fig. 1 is a front elevation of one form of the scale;

Fig. 2 is a section along line 2—2 of Fig. 1;
Fig. 3 is a section along line 3—3 of Fig. 1;
Fig. 4 is a section along line 4—4 of Fig. 3;
Fig. 5 is a section along line 5—5 of Fig. 3;
Fig. 6 is a front elevation of an alternative form of the invention;
Fig. 7 is a section along line 7—7 of Fig. 6;
Fig. 8 is a section along line 8—8 of Fig. 7, and
Fig. 9 is a ticket printed by either form of the invention.

The invention has been shown in connection with weighing mechanism disclosed in Patent No. 1,870,233 but may obviously be applied to other weighing mechanisms of a similar nature.

Referring to Figs. 1 to 5 showing the first embodiment of the invention, the scale comprises the usual platform and base lever system (not shown) connected by draft rod 10 to the intermediate lever 11 which in turn is connected by the tape 12 with pendulums 13 and balanced sector 14. The sector 14 carries rack 15 for operating pinion 16 of indicator shaft 17 which carries the pointer 18 for indicating the weight on dial 19. The dial is graduated from 0 to 100 lbs., the automatic capacity of the scale being 100 lbs.

Intermediate lever 11 carries, outside the scale housing 20, a bar 21 which along its length is marked with 0, 100, 200, 300, and 400 lb. graduations. Shiftable on the bar 21 is the poise 22. When the poise is at the 0 mark of bar 21, the scale will weigh to 100 lbs. When the poise is at the 100 mark on bar 21, the scale will counterbalance weights to 200 lbs., the automatic pendulum counterbalance accounting for 100 lbs., and the poise for the remaining 100 lbs. Similarly, when the poise is shifted to any other mark on bar 21, it will add the indicated beam counterbalancing effect to the automatic counterbalancing effect of the scale.

Combined with the above weighing scale construction is a printing attachment which comprises a type wheel 23 having graduation lines at pound distances apart, every two lines being marked by a type legend for printing the weight corresponding to the alined graduation. The type legends are thus at two pound distances apart. The maximum indication that the type legends can give is 98 pounds while the graduation line following indicates 99 pounds. Type wheel 23 is fast to a shaft 24 mounted at opposite ends on ball bearings 25.

The rear ball bearing (as viewed from the front of the scale) is in a heavy plate bracket 26 while the front bearing is in a parallel heavy plate bracket 27, both brackets being rigidly carried by a frame 28 removably secured by screws 29 to the front wall 30 of the scale frame. The pendulums and indicator shaft are journaled on and carried by a skeleton frame 31. Thus, the type wheel shaft 24 has a separate mounting than the indicator shaft and any thrust directed radially against the shaft will be taken up by its own supports at opposite ends, independently of the supports for the indicator shaft.

To set type wheel 23 correspondingly to the pointer 18, an arm 32 is fixed to shaft 24 of the type wheel. At its upper end, arm 32 is provided with a pin 33 extending parallel to shaft 24. Pin 33 projects inside the head of the automatic scale and there freely passes through a slot 34 in the scale pointer 18, the slot having its longer dimension extending lengthwise of the pointer and radially of the shaft 17. Rotation of the pointer 18 will through the pin and slot connection 33—34 effect similar rotation of arm 32, shaft 24, and type wheel 23. The type wheel will thus be set in accordance with the weight indicated on the dial 19.

To obtain records above 99 lbs. and to 499 lbs., a type section 36 is provided. This type sector is carried by one end of a sleeve shaft 37 which is rotatably carried by frame portion 38 secured to the main printing frame 28. Sector 36 has five type legends 0, 1, 2, 3, and 4 representing the digit of the hundreds denomination. To turn the sector 36, its shaft 37 at the end opposite the sector 36 has fast thereto an arm 40, the upper part of which has fixed to it a thin fan-shaped plate 41 which is provided with indications 0, 100, 200, 300, and 400 corresponding to the same markings on the capacity bar 21. The lower end of arm 40 is forked providing tines 42 between which is located the poise 22.

Thus, by moving arm 40, poise 22 will be shifted and by moving poise 22 arm 40 will be shifted. When poise 22 is at the 0 graduation of bar 21, plate 41 on arm 40 will have its 0 mark opposite a pointer 43 stationarily carried by the central frame part 38 of the printer attachment. When poise 22 is shifted to the 100 mark on bar 21, it will move arm 40 correspondingly to position the 100 mark on the plate 41 opposite pointer 43 and similarly with the other positions of the poise so that the position of the poise will be indicated by the coaction of pointer 43 with the chart plate 41. Arm 40 being fast to shaft 37, shifting of arm 40 as above described will rock shaft 37 to similarly position the type sector 36 in accordance with the location of the poise 22 on bar 21. The type sector 36 may thus be called the capacity printing member as distinguished from type wheel 23 which may be termed the automatic printing member.

The advantages of dividing the scale into minor automatic and relatively major manual load offsetting, indicating, and printing parts will now be explained. One advantage is in the accurate sealing of the scale which means that the movements of the pendulums and related parts are accurately checked with the indications of the pointer 18 on dial 19. The reason for this is that a slight divergence in the accuracy of any portion of the pendulums will be shown by a larger movement of the pointer 18 than if the chart 19 were graduated to 500 pounds, the total capacity of the scale. Thus, an error in a pendulum construction in a 500 pound automatic scale which will cause the pointer movement to err by 4 ozs. which will correspond to a very slight movement of the pointer will in a 100 pound scale cause a movement of the pointer five times as great. Errors in the 100 pound automatic scale can therefore be detected with greater ease and correspondingly corrected with greater accuracy. The better sealing of the lower automatic capacity scale is therefore one reason for thus apportioning the greater offsetting capacity to the poise 22.

Another advantage is obviously in the greater ease of reading and interpolating the wider spaced graduations on the automatic dial.

The main reason and advantage however is in the printing portion of the scale. With a minimum spacing between type legends on a printing wheel, the greater the automatic capacity of the scale the more type legends must be provided on the automatically driven type wheel and hence the larger will be the wheel. The greater the diameter of the type wheel, the greater will be its weight, its inertia, its momentum, and the frictional retarding effect of its bearings. Thus, such a type wheel will react on the weighing mechanism in proportion to its weight, inertia, momentum, and its friction and the smaller the wheel, the less reaction it will have interfering with the accuracy of the weighing mechanism. Accordingly, by apportioning to the automatic capacity of the scale 100 pounds of the total of 500 pounds, the automatically driven type wheel 23 has to carry on its circumference only one fifth as many type legends as it would need if the entire 500 pounds were apportioned to the automatic capacity of the scale. The type wheel 23 is therefore of a minimum weight and diameter and imposes the minimum reaction to the operation of the weighing mechanism.

The mounting of the type members and their shaft 24 independently of the weighing mechanism prevents shocks being transmitted during the printing operation from the type members to the pendulum and connected weighing and indicating mechanism. Such shocks would injure the delicate bearings and mountings of the finely adjusted parts of the weighing mechanism and in effect destroy the accuracy and usefulness of the weighing mechanism. The only connection between the type member 23 and the automatic weighing mechanism is between pin 33 of arm 32 and slot 34 of pointer 18.

As slot 34 is elongated radially of the shaft 17 on which pointer 18 is mounted and pin 33 normally lies midway of the slot, if any shock is transmitted from type member 23 to pin 33, the radial component of such shock will cause pin 33 to move freely up or down in slot 34 and hence no radial force will be transmitted by pin 33 to pointer 18. The only manner in which the pin 33 can cause movement of the pointer 18 is by a force tending to rock the pointer. Such a force will not injure the mounting of the pointer nor be injuriously transmitted to the parts connected with the pointer. A radial force cannot be transmitted from pin 33 of the printing portion to pointer 18 and hence no injury can result to the weighing mechanism from the printing operation on type wheel 23.

The printing operation on capacity type sector 36 will not have any reaction on the weighing mechanism because tines 42 on driving the arm 40 of sector 36 are normally clearly spaced from the poise 22. The poise 22 can therefore rock with bar 21 upon a weighing operation without interference from the arm 40. Also during a printing operation, tines 42 are out of contact with poise 22 and will have no reaction on the poise.

For holding arm 40 clear of poise 22 in each of its five designated capacity load positions, an alining member 45 is secured to the front of the arm. The alining member has five V-notches 46 corresponding to the five designated positions. Coacting with the notches 46 is a roller 47 carried by one end of an arm 48, the opposite end of which is pivoted at 49 to frame 28 of the printing attachment. Arm 48 is pivotally connected intermediate its length with a slide 50 which is urged upwardly by a spring 51. The slide is guided between pins 52 provided on frame 28.

When arm 40 is rocked by the movement of poise 22, plate 45 being secured to arm 40 will also rock and the inclined sides of a notch 46 will cam roller 47 out of the notch, thereby rocking lever 48 to depress slide 50 against the influence of spring 51. As soon as the peak of the tooth between two notches 46 passes roller 47, the latter will be moved by the action of said springs towards the bottom of the notch next to the one out of which it has been cammed. Should poise 22 now be set at the desired graduation on bar 21, it will no longer rock arm 40 and roller 41 in moving towards the bottom of a notch 36 will cam against the side thereof to slightly rock the arm 40, thus alining its type sector in a position corresponding to the position of poise 22 and this will also result in moving the tines 42 of arm 40 completely free of the sides of poise 22.

An imprint from printing members 23 and 36 is taken on a ticket 54 (Fig. 9) inserted between guiding plates 55 carried by the printing frames 27 and 28. Between the ticket and the printing members is a ribbon 56 carried by spools 57 and which may be moved at every printing operation in a well known and suitable way. Below the lower guide 55 is a printing hammer 58 formed on the end of a lever 59 pivoted on pin 60 and having a depending tail 61 which is connected by a spring 62 with a lever 63 also pivoted on pin 60. Lever 63 has a lug 64 at one end held in contact with the bottom of lever 59 aided by spring 62. Attached to the outer end of lever 63 is a spring 65 which is normally unstressed and has no tendency to move the lever 63. Tail 61 of printing lever 59 is normally engaged with a lug 66 on a lever 67 which is pivoted to an upright arm 68 of a hand lever 69. The levers 67 and 69 are normally held in proper relative position by a spring 70. When hand lever 69 is depressed against the resistance of a spring 71, arm 68 rocks clockwise and thereby moves the lever 67 and its lug 66 bodily to the right (as viewed in Fig. 1).

Lug 66 through its engagement with tail 61 of lever 59 rocks levers 59 and 63 counterclockwise, thus stretching spring 65. When lug 66 passes tail 61, it releases levers 59 and 63 and spring 65 thereupon rocks these levers clockwise, causing hammer 58 to move towards the printing members 23 and 36 and make an imprint of the load on card 54. When hand lever 69 rocks counterclockwise to initial position, lug 66 moves to the left and is enabled to pass tail 61 by the yielding of springs 62 and 70.

The upper end of slide 50 has a pin 74 above the lever 67. When the capacity recording member 36 is being shifted, notches 46 force lever 48 downwardly, thereby depressing the slide 50 and causing its pin 74 to rock lever 67 clockwise (as viewed in Fig. 1). The lug 66 of lever 67 is thus released from the tail 61 of the printing lever 59 and operation of hand lever 69 at this time results in moving the lever 67 to the right without rocking lever 59 to tension spring 65. Accordingly, the operation of handle 69 during shifting of the poise and the capacity printing member operated thereby does not effect printing. In the movement of arm 40, the notches 46 periodically permit lever 48 and slide 50 to rise and release the lever 67 but this release is momentary and of insufficient duration to cause operation of hand lever 69 to effect printing.

A summary of the operation of the parts described with reference to Figs. 1 to 5 and 9 follows:

A load placed on the scale lowers draft rod 10 to rock lever 11 which through tape 12 actuates pendulums 13 and indicator 18. The latter indicates the load on dial 19. As the pointer moves to the load point, through coaction of its slot 34 with pin 33, it rocks arm 32 connected to shaft 24 of the printing wheel 23 and thus locates type on the wheel at the printing position for printing the load indicated by pointer 18 on dial chart 19. If the load is less than 100 pounds, the printing operation is then effected. Should the load be greater than 100 pounds, for example, 266 pounds, the operator counterbalances 200 pounds of the load by shifting the poise 22 to the 200 mark on bar 21. In so doing, the right side of poise 22 (as viewed in Fig. 1) engages the right tine 42 and rocks the arm 40 with its type sector 36 counterclockwise. During this movement, alining plate 45 rides on roller 47. When poise 22 is located on the 200 mark of bar 21, the operator releases it and roller 47 thereupon cams the plate 45 and arm 40 further counterclockwise freeing the tines 42 of the poise 22 and alining the type legend 2 of printing sector 36 with an index type legend 75 provided on the stationary lug 76 rigid with the front frame plate 27.

Pointer 18 will be influenced by a load of 66 pounds and will correspondingly locate type legend 66 of type wheel 23 in line with index 75. The position of the type after the above operations is indicated in Fig. 4, handle 71 is now depressed and an imprint made on card 54 reading 266 pounds. The imprint of the index 75 indicates the exact load and should the load be 266.5 pounds, the index 75 will point between the graduation at 266 and the graduation directly above it which corresponds to 267 pounds.

Figs. 6, 7, and 8 illustrate a modification of the printing attachment in which the frame 80 is attached by screws 81 to the front 300 of the scale frame which includes the framework 310 for mounting pendulums 130 and indicator shaft 170 carrying pointer 180. Pointer 180 is operated by the weighing mechanism through a range of 100 pounds as in the previously described modification to indicate the load on dial chart 190. To frame 80 is secured the bracket 82 which together with frame 80 journals shaft 83 of printing wheel 84. The wheel 84 is driven by pointer 180 through a pin and slot connection as in the first embodiment. To supplement the automatic range of the scale, poise 220 is shiftable on bar 210 to one of the indicating marks 0, 100, etc. on the bar. In shifting the poise, it engages the forked end 85 of a member 86 having rollers 87 which slidably mount the member on a cross bar 88. The shaft of the upper roller 87 extends forwardly into a slot 89 in arm 90 which is rigid with one end of shaft 91 journaled in frame plate 80 below shaft 83 of type wheel 84. Shaft 91 carries type sector 92 which has type for printing 0, 1, 2, 3, or 4 in the hundreds denomination.

As in the first modification, type members 84 and 92 are firmly mounted independently of the weighing mechanism and connected to the latter in a manner to obviate reactive interference with operation of the weighing mechanism or transmission of shock to the latter during the printing operation. Arm 90 rigidly carries alining plate 93 which has notches 94 coacting with a roller 95 on a lever 96 secured to pivot 97 mounted on the frame 80. Lever 96 is normally urged by a spring 98 in a direction to maintain roller 95 at the bottom of a notch 94. Shifting of the poise 220 slides member 85 along bar 88 to rock arm 90, type sector 92, and alining plate 93. As plate 93 moves it cams roller 95 out of notches 94. When the poise is set at the desired graduation on bar 210, roller 95 moves to the bottom of a notch 94 and cams arm 90 ahead to free member 85 of poise 220 and to maintain and aline, at the printing position, that type legend of sector 92 which corresponds to the setting of poise 220.

The means for effecting the imprint from type members 84 and 92 is similar to that of the first described embodiment and includes the hand lever 690 equivalent to lever 69 of the first form. Unlike lever 69 however lever 630 is provided with a pin 99 above a vertical arm 100 fast to pivot 97. When the arm 90 is being shifted, notched bar 93 generally holds lever 96 depressed to move the arm 100 to the left (as viewed in Fig. 6) and position the upper edge of arm 100 beneath pin 99 on hand lever 690. Accordingly, depression of the print operating handle 690 at this time is effectively prevented by engagement of pin 99 with the upper edge of arm 100.

The momentary rocking of arm 100 to the right as the roller 95 moves to the bottom of a notch 94 is of insufficient duration to permit effective operation of handle 690. The danger of effective operation of handle 690 before setting of the arm 90 is completed is further minimized by the fact that the operator will not tend to operate the handle while shifting the poise. The tendency is for him to operate the handle as soon as he has set the poise at the desired graduation mark. At this time, however, the roller 95 will not be seated at the bottom of a notch 94 and the lever 95 will thus be in lowered position and the upper edge of arm 100 in locking relation to handle 690. The spring 98 then moves the roller 95 to the bottom of the notch 94 corresponding to the poise setting and thereby releases fingers 85 of arm 90 from poise 210. At the same time the upper edge of arm 100 is moved away from pin 99 to release the printing handle. Intersecting the upper edge of arm 100 is a notch 101 which forms the upper terminus of an arcuate edge 102 on the left side of arm 100. The edge 102 is arcuately described about pivot 103 of lever 690. Should the spring 98 fail to hold lever 96 in absolutely correct locking position with respect to bar 93, then pin 99 will be above the notch 101 and as the lever 690 is depressed, the pin will cam against the walls of notch 101 and force the arm 100 to the right (as viewed in Fig. 6), thereby moving lever 96 and its roller 95 upwardly and into positive locking and alining cooperation with bar 93.

Continued depression of the lever 690 will cause its pin 99 to ride along the arcuate edge 102 of arm 100 and thus lock it against counterclockwise movement. Consequently, lever 96 will also be locked against counterclockwise movement so that bar 93, arm 90 and the capacity printing wheel cannot be shifted during the printing operation.

The operation of the second embodiment is believed clear from the above description and from the summary of operations of the first embodiment. The record made by the second embodiment is of the type shown in Fig. 9. In either embodiment of the invention, the recording means comprises a unitary attachment which may be readily assembled to any ordinary dial scale with a minimum of changes in the scale pointer and sight window. Just as readily, the whole recording assembly may be detached by merely removing the supporting plate 28, in the first embodiment, and 80 in the second embodiment.

While there has been shown and described and pointed out the fundamental novel features of the invention as applied to the several modifications, it will be understood that various omissions and substitutions and changes in the form and details of the devices illustrated and in their operation may be made by those skilled in the art without departing from the spirit of the invention. I, therefore, intend to be limited only as indicated by the scope of the following claims.

What is claimed is:

1. In a scale wherein a weight shaft is automatically rotated in response to a load; in combination, a recorder shaft coaxial with the weight shaft, a frame for journaling the recorder shaft independently of the weight shaft, a recording member connected to the recorder shaft, means coacting with the recording member for effecting a recording operation, and a positive driving connection between the shafts including a pair of rigid elements, one carried by the weight shaft and the other by the recorder shaft, one of the elements having a pin and the other a slot for receiving the pin and having its walls constantly in positive rotational driving engagement with opposite sides of the pin to positively couple the elements to each other for rotation in either clockwise or counter-clockwise direction, the slot also being elongated radially of the shafts to provide radial play for the pin to thereby prevent the recording operation from transmitting forces radially against the weight shaft.

2. In a scale having load offsetting mechanism including capacity weight means settable to offset predetermined loads; in combination, a recording member means for setting the recording member in accordance with the setting of the capacity weight means comprising an element for moving the recording member, a cooperating element, one of said elements having a notched portion with a series of camming notches corresponding in number and relative arrangement to the predetermined settings of the capacity weight means, the other element engaging said notched portion and movable into and out of the notches during the setting of the recording member, and means for automatically forcing the latter element towards the bottom of the notch corresponding to the setting of the capacity weight means and thereby causing camming coaction between the elements for moving the first-mentioned element in a direction to set the recording member to a predetermined position exactly corresponding to the setting of the capacity means.

3. In a scale having load offsetting means including a lever and a poise; in combination, a recording member for recording even weights offset by the poise, means for setting the recording member in accordance with the setting of the poise comprising an element controlled by movement of the poise for moving the recording member, a cooperating element, one of said elements having a notched edge with a series of camming notches corresponding to even weight positions of the poise, the other element engaging said notched edge and movable into and out of the notches during setting of the recording member, and means operable after the poise is set for automatically forcing the last mentioned element towards the bottom of the notch corresponding to an even weight setting of the poise and thereby causing camming coaction between the elements for moving the first-mentioned element independently of the poise in a direction to set the recording member to a predetermined position exactly corresponding to the setting of the poise and while the latter remains stationary at its set position.

4. In a scale having load offsetting means including a lever and a poise settable at different predetermined points of the lever; in combination, a recording member, an arm for actuating the member to positions corresponding to the setting of the poise, an element connected to said arm for movement therewith and having a series of camming notches, corresponding in number and relative arrangement to the predetermined positions of the poise, a dog movable into and out of the notches as said element is moved by the arm, and means adapted when the arm is released for automatically forcing the dog towards the bottom of the notch engaged thereby to thereby cam against the sides of the notch and force said element and the arm connected therewith to move in a direction for setting the recording member in exact correspondence with the setting of the poise.

5. In a scale having load offsetting means including a lever and a poise settable longitudinally of the lever at different points; recording means comprising in combination, a recording member, an actuator for moving the recording member to a position corresponding to the setting of the poise, an interlock between the actuator and poise effective while the latter is being set to compel the actuating means and poise to be commonly operated, and a device automatically releasing the interlock from the poise after the latter is set in desired position to thereby relieve the load offsetting means of the reactive influence of the recording means.

6. In a scale having automatic load offsetting means operating a weight shaft and connected to a lever along which a poise is movable to offsett loads greater than the capacity of the automatic offsetting means and having a dial housing and frame for journaling the weight shaft, a unitary recording attachment comprising in combination, an auxiliary frame attached to a face of the dial housing, a second shaft wholly journaled on said auxiliary frame, operating connections from the weight shaft to the second shaft, a third shaft wholly journaled on the auxiliary frame, operating connections from the poise to the third shaft, recording members carried by the second and third shaft, and means carried by the auxiliary frame for coacting with the recording members to make a joint record of the total load offset by the automatic offsetting means and by the poise, the entire recording attachment being attachable or removable as a unit by attaching or detaching the auxiliary frame from the face of the dial housing.

7. In a scale having automatic load offsetting and registering means including a rotatable indicator shaft carrying a pointer for scanning a dial chart, an intermediate lever below the indicator shaft and connected to the automatic offsetting means, a poise movable along the lever to offset loads beyond the capacity of the automatic means, a housing for the scale including a dial head enclosing the indicator shaft, pointer, and chart and having a sight window in one face for the chart and pointer at the side of the scale from which the poise is operated; a recording attachment comprising in combination, an auxiliary frame secured to the face of the dial head adjacent the sight window and leaving the chart and dial indication fully exposed, a second shaft wholly journaled in the auxiliary frame and coaxial with the pointer shaft, operating connections from the pointer shaft to the second shaft, a type member connected to the latter shaft, a third shaft wholly journaled on the auxiliary shaft, a type member connected to the third shaft, means associated with the poise for setting the latter type member in accordance with the poise setting, and means mounted on the auxiliary frame for coacting with said type members to print a joint record of the total load offset by the automatic means and the poise.

8. In a scale having load offsetting means including a beam along which a poise is slidable to offset different loads; in combination, a type member, a frame for movably mounting the type member, a lever connected to said type member for setting a type member and operating connections between said poise and lever for swinging the latter as the poise slides along the lever to thereby set the type member to correspond with the position of the poise along the beam, said operating connections including a pair of spaced elements connected to one end of the lever and flanking the sides of the poise to be engaged by the latter when the poise is shifted along the lever, and a device for automatically freeing the spaced elements from engagement with the sides of the poise after the poise is set to thereby relieve the load offsetting means of the reactive influence of the operating connections.

9. In a scale having interconnected automatic and manual load offsetting means, each for offsetting a part of the load, and taking different equilibrium positions dependent on the load and the setting of the manual load offsetting means; in combination, a recording member, operating connections from the manual load offsetting means to the recording member to set the latter by the setting of the said manual load offsetting means and during the setting operation of said means to record the part of the load offset by said manual offsetting means, a manually operable device cooperating with the recording member to make a record of the offset load, and means actuated by the said operating connections for preventing effective operation of said device while the operating connections are in motion and until the manual load offsetting means reaches any of its different equilibrium positions.

10. In a scale having manually variable load offsetting means settable at different, predetermined, points; in combination, a recording member, operating connections from the manual load offsetting means to the recording member to set the latter to record the load offset by said means at the predetermined points, a manually operable device cooperating with the recording member to record the offset load, an interlock between said operating connections and said device to prevent effective operation of said device while said offsetting means is between any adjacent pair of said predetermined points.

11. In a scale having a weigh beam and a poise settable along said beam at any one of different, spaced, predetermined points of the beam to offset different loads; the combination of a recording member, means for conjointly and dependently setting the poise and the recording member to position the latter for recording the load offset by the poise, a manually controlled device for causing the recording member to record the load, and an interlock between the aforesaid means and the device to prevent effective operation of the latter while the poise is located between any adjacent pair of said predetermined points of the beam.

12. In a scale including variable load offsetting means; in combination, a recording member, releasable connections between the offsetting means and the recording member for operating the latter in accordance with the setting of the offsetting means, a device cooperating with the recording member for making a record, and means for automatically releasing said connections from the offsetting means prior to operation of said device.

13. In a scale including variable load offsetting means; in combination, a recording member, operating connections between the offsetting means and the member for setting the latter in accordance with operation of the offsetting means, a device cooperating with the recording member for making a record of the offset load, means for automatically releasing the connections from the offsetting means, and means for preventing operation of said device prior to releasing said connections.

EDWARD J. VON PEIN.